Oct. 4, 1960  M. PANERAI ET AL  2,954,665
TIGHT SEAL DEVICE
Filed Nov. 26, 1956
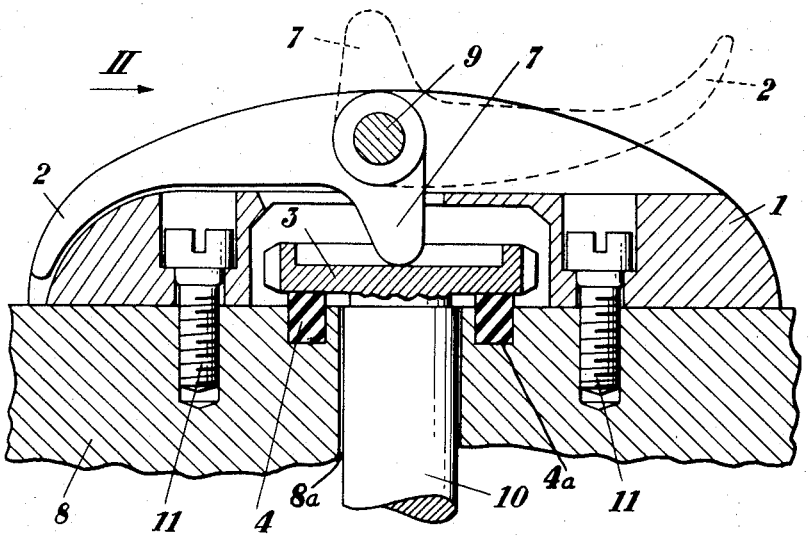
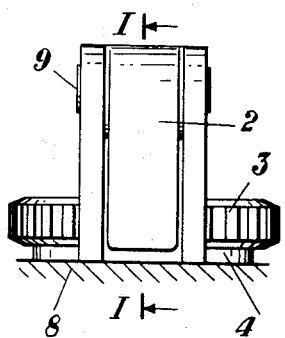
INVENTORS
M. PANERAI
G. PANERAI
BY

United States Patent Office 2,954,665
Patented Oct. 4, 1960

2,954,665
TIGHT SEAL DEVICE

Maria Panerai and Giuseppe Panerai, both of 2 Piazza Galileo Ferraris, Florence, Italy Filed Nov. 26, 1956, Ser. No. 624,234

Claims priority, application Italy Nov. 30, 1955

1 Claim. (Cl. 58—90)

The present invention relates to a tight seal device for the control knob of instruments, particularly for the setting and winding knob of watches.

It is known that it is a problem to provide a tight seal for the case of an instrument which must be able to work when immersed in a fluid medium, the leakage of which medium into said case would impair the mechanisms therein contained. A typical but not limitative example is that of an instrument which is to be used under water. Accordingly, it is to be noted that although for sake of clarity the following disclosure will be related to the case of a watch, which is provided with the characteristic setting and winding mechanism, said disclosure must not be construed as limiting the scope of the invention, nor is the reference to water as the fluid which is to be prevented from entering the case any further limitation.

In some previous patents of the same applicants there have been disclosed some devices designed to provide a similar seal, wherein a packing ring acts either on the shaft to be sealed, or on a part rigid or integral with said shaft or forming an operative part thereof.

According to the present invention, on the contrary, said sealing ring is still used, but said ring bears against the winding knob of said instrumentality so as to leave the actual winding shaft free from any contact with the sealing ring.

In one preferred embodiment, the instrument case carries a means whereby it is possible to press the winding knob on said sealing ring by a positive action from outside the case, said means being able to release said knob, both in order to rotate the shaft to wind the watch, and to axially shift said shaft to set the watch.

In another preferred embodiment, the instrument case is provided with means affording a constant biasing action so as to keep the sealing relationship between the sealing ring and the winding knob, the action of said means having to be overcome, particularly to obtain the axial shift necessary to set the watch, while at the same time the sealing relationship between the sealing ring and the knob is such as to allow the knob to be rotated with respect to the packing ring without impairing the efficiency of the required seal.

A preferred form is hereinafter described only by way of example and with reference to the attached drawings wherein:

Fig. 1 shows, on an enlarged scale, a diagrammatical cross-sectional view, taken along the line I—I of Fig. 2, of the sole device according to this invention, there being depicted a portion of both the case and the winding shaft;

Fig. 2 shows an end view of the device of Fig. 1, taken in the direction of the arrow II of Fig. 1.

As seen in the figures, the case 8, only a portion of which is shown, has a hole 8a therein, through which passes the winding and setting stem 10 for the instrument. A small clearance is left between the hole and the stem. A knob 3 is fixed to one end of the stem 10 for moving the stem. The case 8 has an annular groove 4a in the outside surface thereof which is concentric with and spaced from the hole 8a. A sealing ring 4 is positioned in said annular groove 4a and projects from the groove beyond the outside surface of the case 8 into a frictional contact with the under surface of the knob 3.

A frame 1 in the form of a bridge has two sides detachably fixed to the outside of the case 8 by the screws 11. The knob 3 is received in the central cavity which is defined in the bridge, the knob projecting laterally of the frame to both sides thereof.

A lever is pivoted centrally on the part of the frame over the knob, a pivot 9 being mounted in the frame for the mounting. The pivot 9 extends in a direction perpendicular to the stem 10. The lever has two arms, a shorter arm 7 and a longer arm 2, which are substantially perpendicular to each other. The shorter arm 7 has one end abutting against the outer end surface of said knob, and in the position shown in full lines in Fig. 1, presses the knob against the sealing ring. When the longer arm 2 is rotated in a direction away from the case 8, the arm 7 is lifted from the knob.

In order to wind up the watch or to set same, it will be sufficient to rotate the lever arm 2 about the pivot 9 carrying said lever to the position depicted in dotted lines.

The arm 7 thus disengages from the knob 3 releasing the engaging pressure between the knob and the seal ring; the knob 3 which is thus freed can be actuated as in any other watch.

We claim:

A sealing device for a controlling knob for an instrument, particularly for the knob on the winding and setting stem of a watch mechanism, which device consists essentially of the combination of a case having a radial hole in the periphery of the case, a winding and setting stem passing through the said radial hole with a small clearance, a knob fixed to and moving the said stem, said case having an annular groove in the outside surface thereof concentric with and spaced from the said radial hole, a sealing ring in the said annular groove projecting therefrom above the outside surface of the said case, said sealing ring having its outer end surface in frictional contact with the under surface of the said knob, and a frame in the form of a bridge having two sides detachably fixed to the outside of the said case and having a central cavity receiving said knob therein, said knob projecting laterally of the two sides of the said frame, a lever having two arms of different lengths, said lever pivoted centrally on the part of the said frame over said knob for movement around an axis perpendicular to the said stem, said arms of the said lever being perpendicular to each other, the longer arm moving the short arm of the said lever, said short arm abutting against the outer end surface of the said knob and pressing said knob against said sealing ring when said longer arm lies on the outer surface of the said frame and moving away from said knob when said longer arm is rotated so as to rise from said frame.

References Cited in the file of this patent

UNITED STATES PATENTS

| | | |
|---|---|---|
| 424,191 | Fitch | Mar. 25, 1890 |
| 1,172,601 | Jaques et al. | Feb. 22, 1916 |
| 1,292,540 | Tough | Jan. 28, 1919 |
| 2,385,234 | Schmitz | Sept. 18, 1945 |

FOREIGN PATENTS

| | | |
|---|---|---|
| 255,477 | Switzerland | Jan. 17, 1949 |
| 298,200 | Switzerland | July 1, 1954 |
| 305,174 | Switzerland | Apr. 16, 1955 |